US012301085B1

(12) United States Patent
Johnson, II

(10) Patent No.: US 12,301,085 B1
(45) Date of Patent: May 13, 2025

(54) BI-POLAR ELECTRO-MAGNETIC PISTON WITH POWER MANAGEMENT SYSTEM

(71) Applicant: Frank Matthew Johnson, II, Augusta, GA (US)

(72) Inventor: Frank Matthew Johnson, II, Augusta, GA (US)

( * ) Notice: Subject to any disclaimer, the term of this patent is extended or adjusted under 35 U.S.C. 154(b) by 439 days.

(21) Appl. No.: 17/062,543

(22) Filed: Oct. 2, 2020

(51) Int. Cl.
*H02K 7/065* (2006.01)
*H02K 53/00* (2006.01)
*H02K 33/16* (2006.01)

(52) U.S. Cl.
CPC ............. *H02K 7/065* (2013.01); *H02K 53/00* (2013.01); *H02K 33/16* (2013.01)

(58) Field of Classification Search
CPC .............................. H02K 7/065; H02K 53/00
See application file for complete search history.

(56) References Cited

U.S. PATENT DOCUMENTS

| 6,326,706 B1* | 12/2001 | Zhang | F04B 35/045 |
| | | | 310/12.32 |
| 2013/0076272 A1* | 3/2013 | Gialdella | H02P 6/006 |
| | | | 318/14 |

* cited by examiner

*Primary Examiner* — Michael C Zarroli

(57) ABSTRACT

The electromagnetic piston having two coils connected in series with a capacitor between the two coils. An electromagnetic chamber within the piston with one of the coils at each end of the chamber. A second set of coils connected to a power source. Copper connections on the piston to facilitate movement of power.

1 Claim, 8 Drawing Sheets

BI-POLAR ELECTRO-MAGNETIC PISTON WITH POWER MANAGEMENT SYSTEM

BACKGROUND OF INVENTION

The present invention improves on the combustion engine design. It allows for the same work to be accomplished in a cleaner, more efficient environment. Rather than chemical combustion, it is replaced with Magnetic flux, concentrated within a small area around a central axial point providing areas for heat exchange in a more dynamic system. In comparison, U.S. Pat. No. 6,326,706-B1 innovations are the most similar and composed within.

A. Field of Invention

The reciprocal motor, most closely relates to the combustion engine design, while utilizing the linear motion for the pistons, and close axial positioning to simulate ElectroMagnetic Linear Compression within each individual pistons.

B. Description of Related Art

In Zhang's Linear Motor, current is used to control the actuation of a piston located in the vicinity of the magnetic flux produced from the coils. The same reliability and simplicity of use are being utilized (actuation of a piston), and the electrical design (Lenz Law) is at the center of this invention and U.S. Pat. No. 6,326,706-B1. The difference in Zhang Linear Motor and EMPs, starts with the number of coils: his single coils system which spans the length of the device. EMPs share coils concentrated into a smaller surface area and multiple coils are utilized in this design; ones which are located at 2 different radii but share the same central axial point. EMP coils are similar to Zhang Linear Motor, in the sense they both can operate with ferrous and non-ferrous material, and are sensitive to magnetic fluxes. Additionally, EMPs have a secondary set of coils along the original central axial point that has the ability to redirect the magnetic inertia back to its source.

BRIEF INVENTION SUMMARY

Simply, ElectroMagnetic linear motors inside the pistons of a traditional rotary motor. The efficiencies produced from the integration of these three components from the linear actuation of an electromagnetic source is exactly what is required to traverse a piston through its chamber. Rather than combustion, EMP w/PMS will use magnetic flux; it is important to note that EMPs can operate with or without the addition of the PMS. The Power Management system is simply an addition which will reduce time between excitation of the piston and chamber coils. In this design preceding components eliminate the need for additional timing considerations. Additional advantages of this transition are the capacitance, and resistance stored as magnetic flux is when switched off can discharge slowly or recharge the battery by the de-energizing of the coils. As this ElectroMagnetic Piston moves through its chamber, residual and counter-fluxes will accumulate in the ElectroMagnetic Recycle System.

Upon initial excitation of the coils, because internal capacitances exist within the design, one coil can be positive and across the capacitor the other "negative". Magnetic fluxes build over time. When the system is charging, actuations are minimal; and in contrast, when larger voltages are applied, like a see-saw and a heavier weight, the larger the magnetic flux moves from one side to the other. The faster the frequency, the piston response is quicker. When multiple coils are interconnected in a series, one piston's coil is charging (on top) the others, and voltages can traverse across capacitors; like in the Bi-Polar EMP, a second set of coils will charge inversely the others (on inside of chamber positive and on the bottom of the EMP is negative). Much like traditional magnets, in coils, opposite charges attract, while like charges repel.

This internal action continues until the piston reaches the other side of the chamber, on the top and bottom of each piston internal coils are connected to power, with PMS or without, and the bottom coil of the piston changes positive. The capacitance will flip, and the once top coil of the piston will be grounded and the coil will flip negative. The process will repeat itself until disconnected from the power source.

A separate layer of coils, the ElectroMagnetic Recycling System connected to the battery, will produce a charge, above that created, each time the energized capacitance passes through the independent layer of coils. Much like a transformer, the Chamber layer, or an Independent layer of coils can either step up or step down the extra current based on the number of turns, size of the wire, or/and proximity to the full flux of the piston.

DETAILED DESCRIPTION OF THE DRAWINGS

Figure 1:
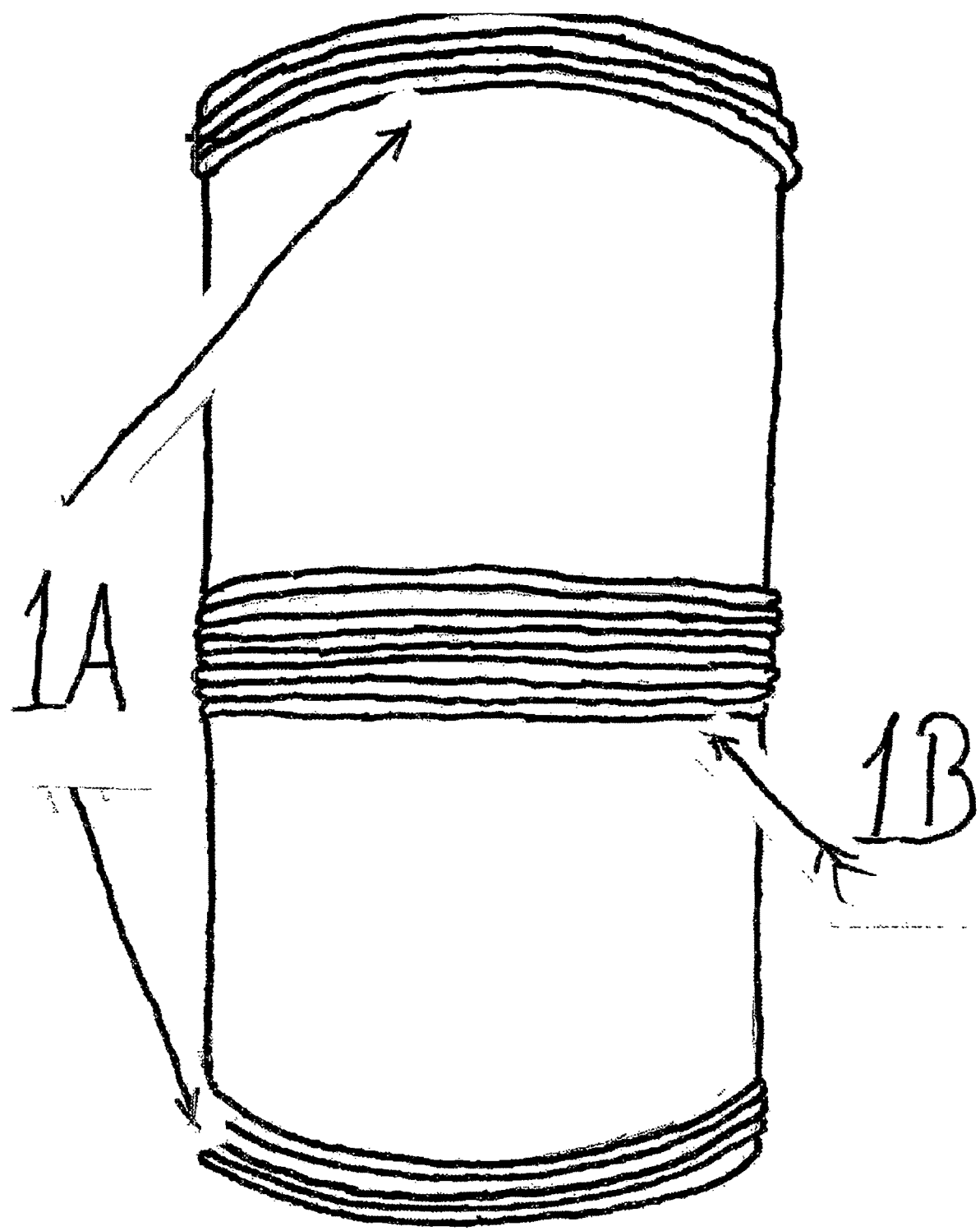
FIG. 1 ElectroMagnetic Chamber
  1A. Coils of the chamber connected to the positive terminal of the battery and ground.
  1B. EMRS—out layer of coils, isolated from EMP and EMC.

In FIG. 1, Power enters the system through 1A coils. The positive sides of the system are the outer coils on the chamber.

EMRS are the outer layers of coils, 1B, isolated from physical or electrical contacts of the EMP, yet situated directly around its central axial point, designed to either step up or step down the output voltage.

Figure 2:
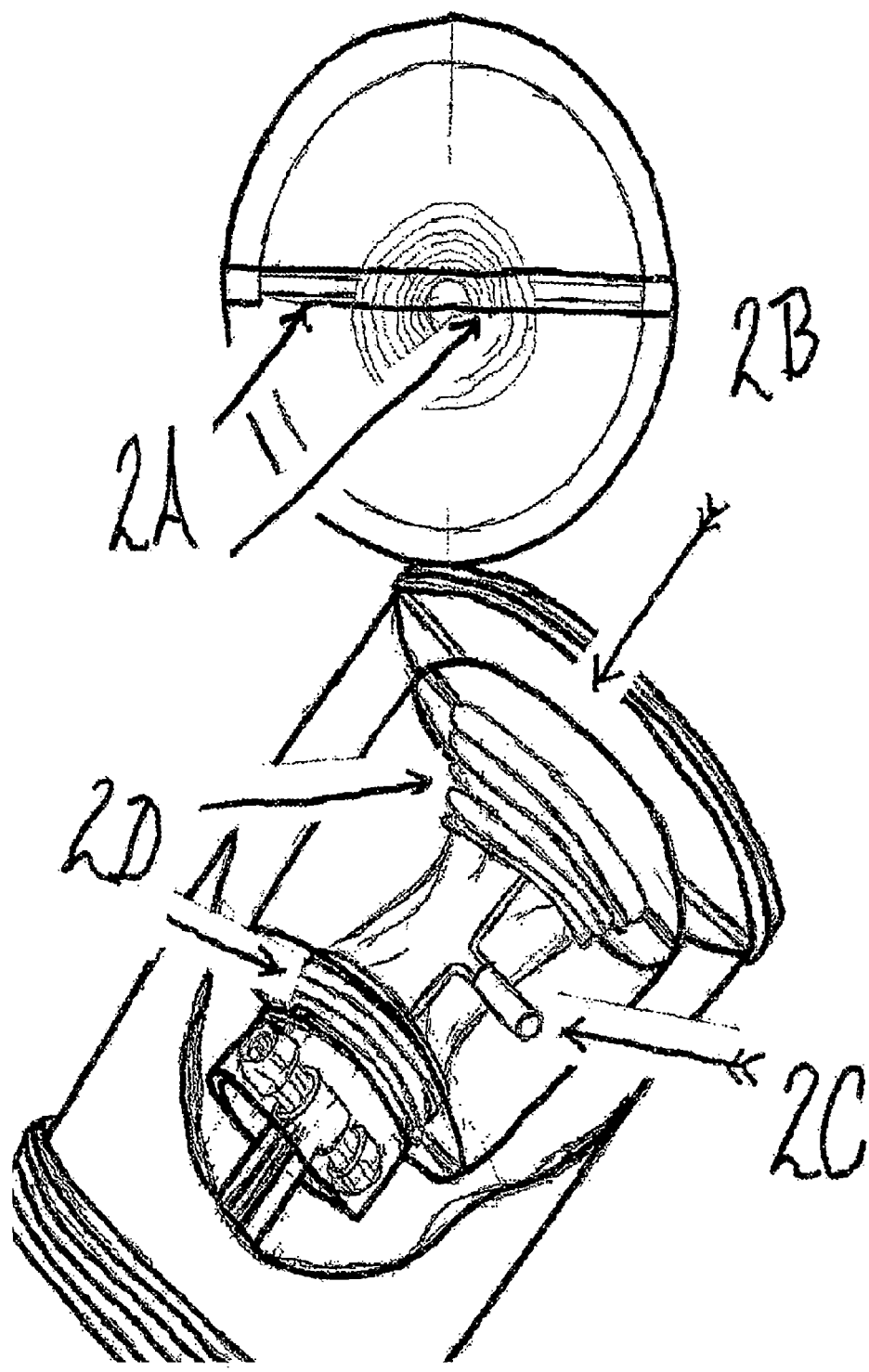
FIG. 2 Top view of the invention and cut-out of EMC, showing EMP inside, PMS on top
  2A. Power Management System (PMS)—a layer of conductive material on top and bottom of EMP (outside) and EMC (inside).
  2B. Electro-Magnetic Piston (EMP)—like U.S. Pat. No. 6,326,706-B1, electrical properties are similar.
  2C. Capacitor-exponentially larger than required for rated configuration.
  2D. Coils-localized are varies towards application: length and diameter of wire, amperage rating and environment of operation.

In FIG. 2, Top view of the invention and cut-out of EMC, showing EMP inside its chamber, PMS on top.

2A is the Power Management System (PMS)—a layer of conductive material that connects the chamber and the piston, on the top and bottom of the piston's outermost wall and top and bottom of the chamber's innermost wall. The ability to conduct high amounts of electricity quickly is paramount; the faster the system charges and discharges will be the sole factor in determining output torque.

2B is the Electro-Magnetic Piston (EMP)—like U.S. Pat. No. 6,326,706-B1-their electrical properties are similar. Obvious variables include coil placement and durability, and fluxes are centralized around a single axis. Rather the outputs are vastly different, EMP w/PMS has the potential to operate on the scale of nano seconds, while combustion expands in milliseconds. Rather than elongated along the path of travel, the coils of this invention are collected within localized areas which amplify effects for minimal duration.

2C is the Capacitor, exponentially larger than required for rated configuration.

2D are Coils-localized are varies towards application: length and diameter of wire, amperage rating and environment of operation. While researching for this invention, a 22-gauge wire with plastic coating, aluminum shaft, 2 D batteries, and electrical tape, I was able to more than double the electrical flux within a coil (compact within a square in.) Reaching 35000 mG, more than doubling the magnetic potential of inert components.

Figure 3:
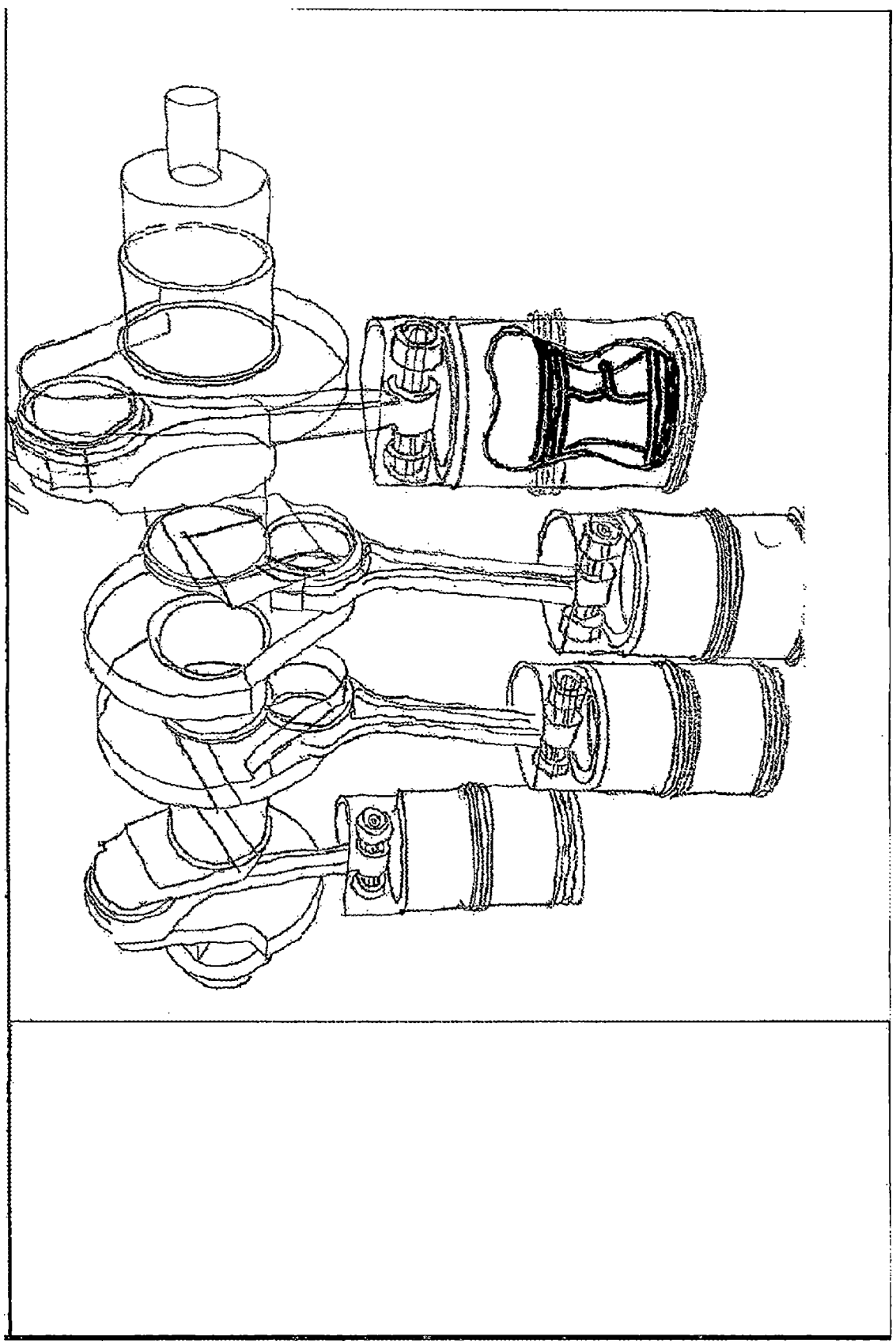
FIG. 3 Entire assembly connected to crankshaft
FIG. 4 EMP and EMC (size comparison)
FIG. 5 Cross section of magnetic flux in relation to central axial point
FIG. 6 EMP at the top of EMC.

FIG. 3 is the entire assembly connected to the crankshaft. A depiction of Inline four-cylinder EMP set up connected to crank-shaft-EMPs connected in a series (one EMRS, electrically, connected to the ignition coils of the next chamber) allows for the output of one piston to transfer to another. This process compounds the initial charge exponentially, conserves electrical potential and multiplies electrical output.

Figure 4:
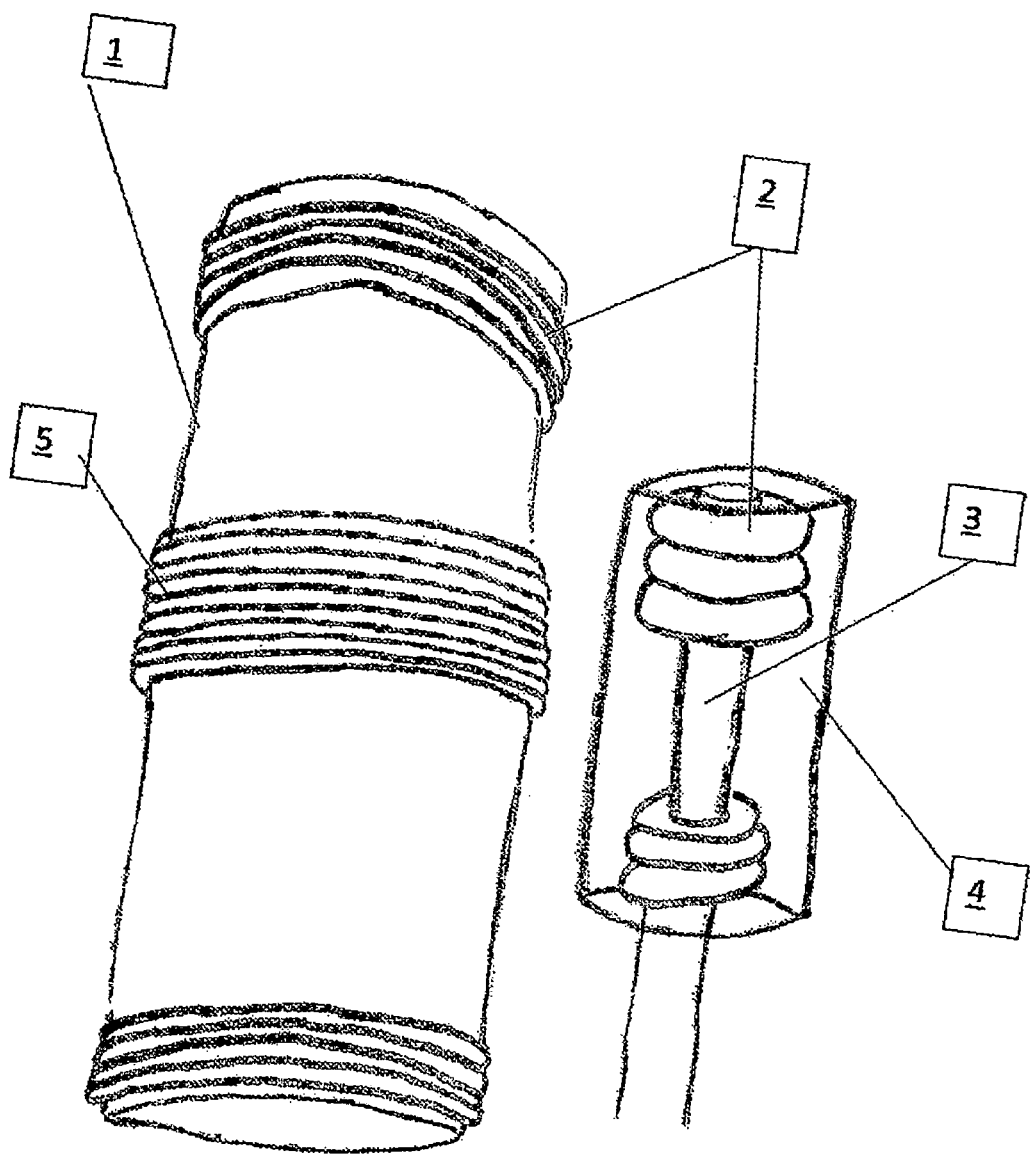

FIG. 4 is EMP and EMC (size comparison)

EMP and EMC side by side (current)—Future versions of this design will include the piston (EMP) decreasing physically in size, and increasing electrical magnetic flux; while simultaneously increasing the size of the chamber (coil's length and gage) to maximize the electrical output.

Figure 5:
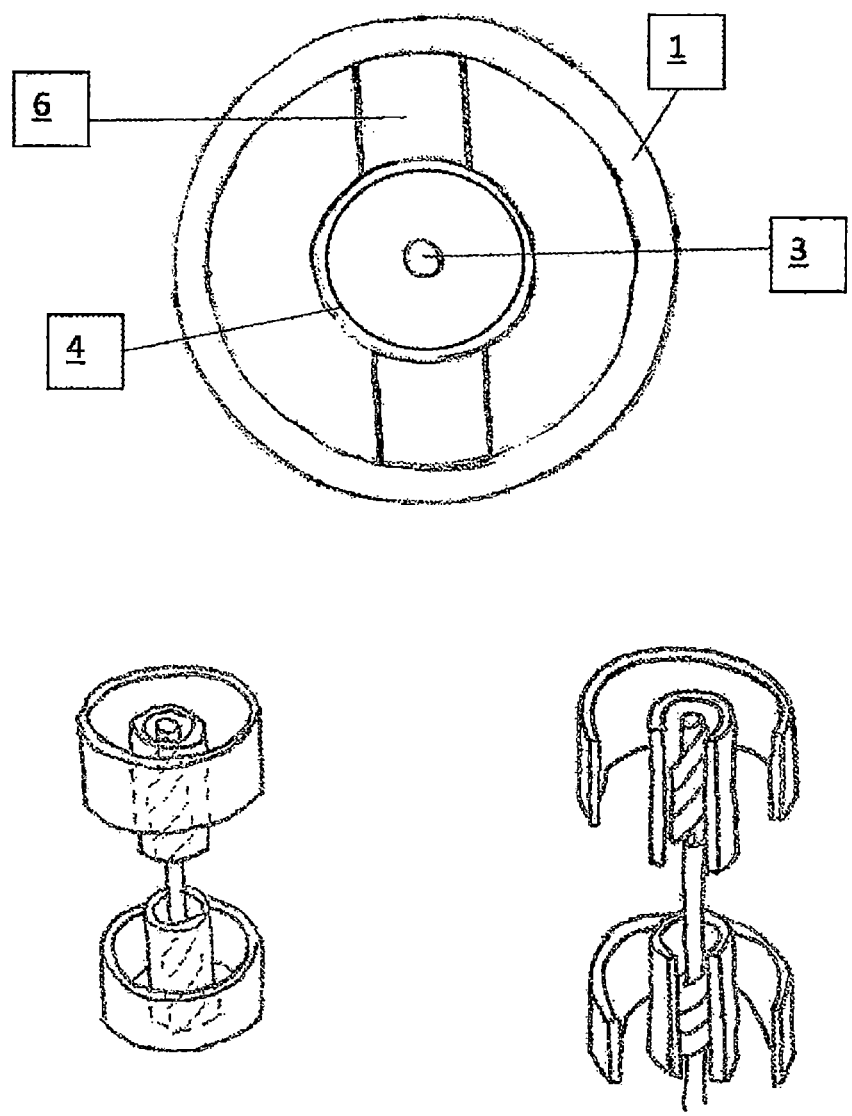

FIG. 5 is a cross section of magnetic flux in relation to central axial point

The cross-sectional view of EMP, EMC, and EMRS—on top—Collectively, these elements will overcome the combustion created in current ICE PSI piston engines, and will serve as a suitable replacement in the conversion of transportation to less carbon intensive solutions. Future designs will be to vary the electrical output to accommodate a variety of applications.

Figure 6:
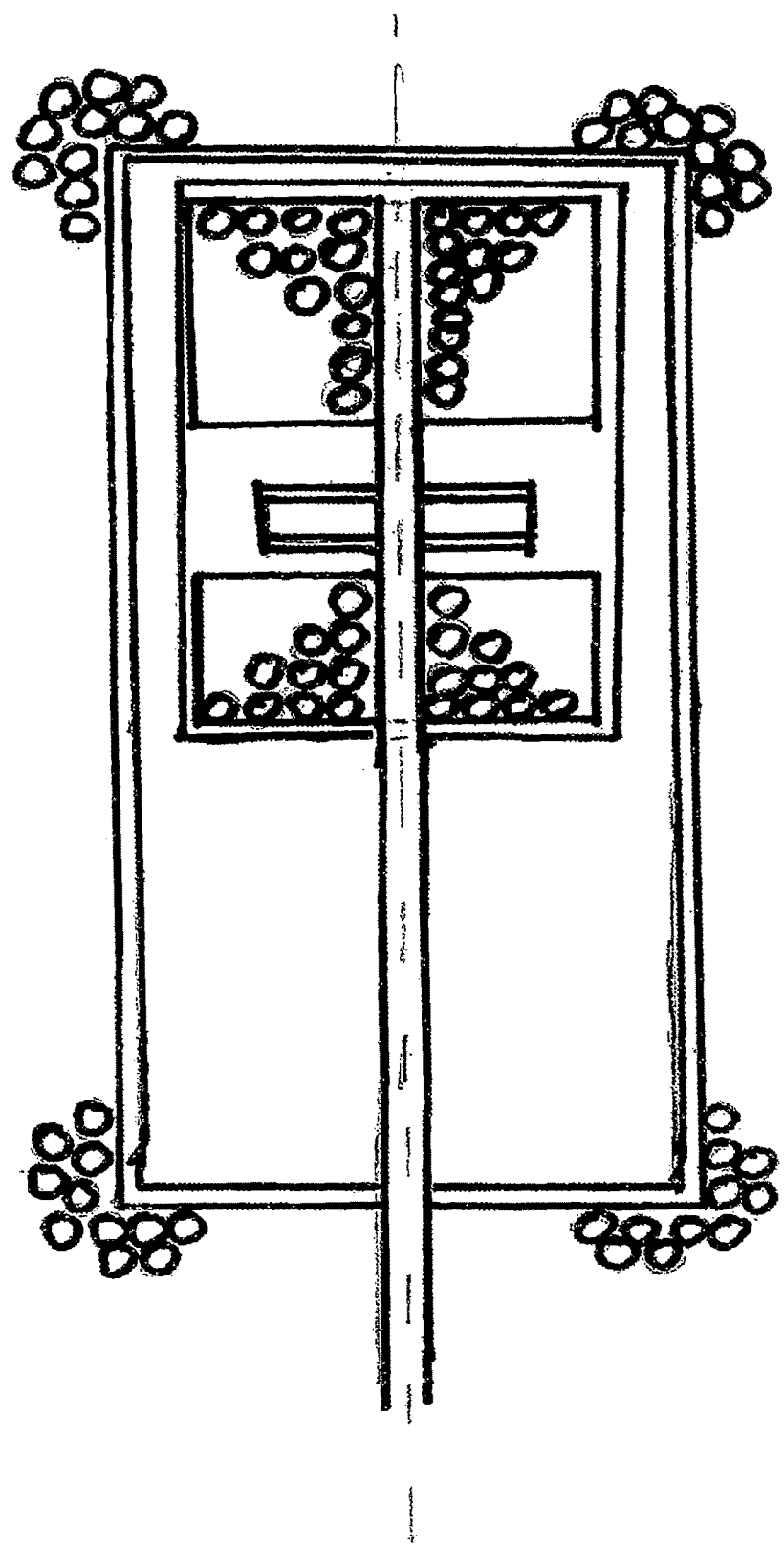

FIG. 6 EMP at the top of EMC

A cross-sectional view of EMP, EMC, and EMRS—on transition—Power enters the system through the upper coil, then transfers to the upper piston coil. Next, the capacitor energizes then stabilizes. The inner coil, connected in series to the capacitor, and ground (closing the circuit), will display the opposite charge, attracting the piston to the bottom of the chamber.

Figure 7:
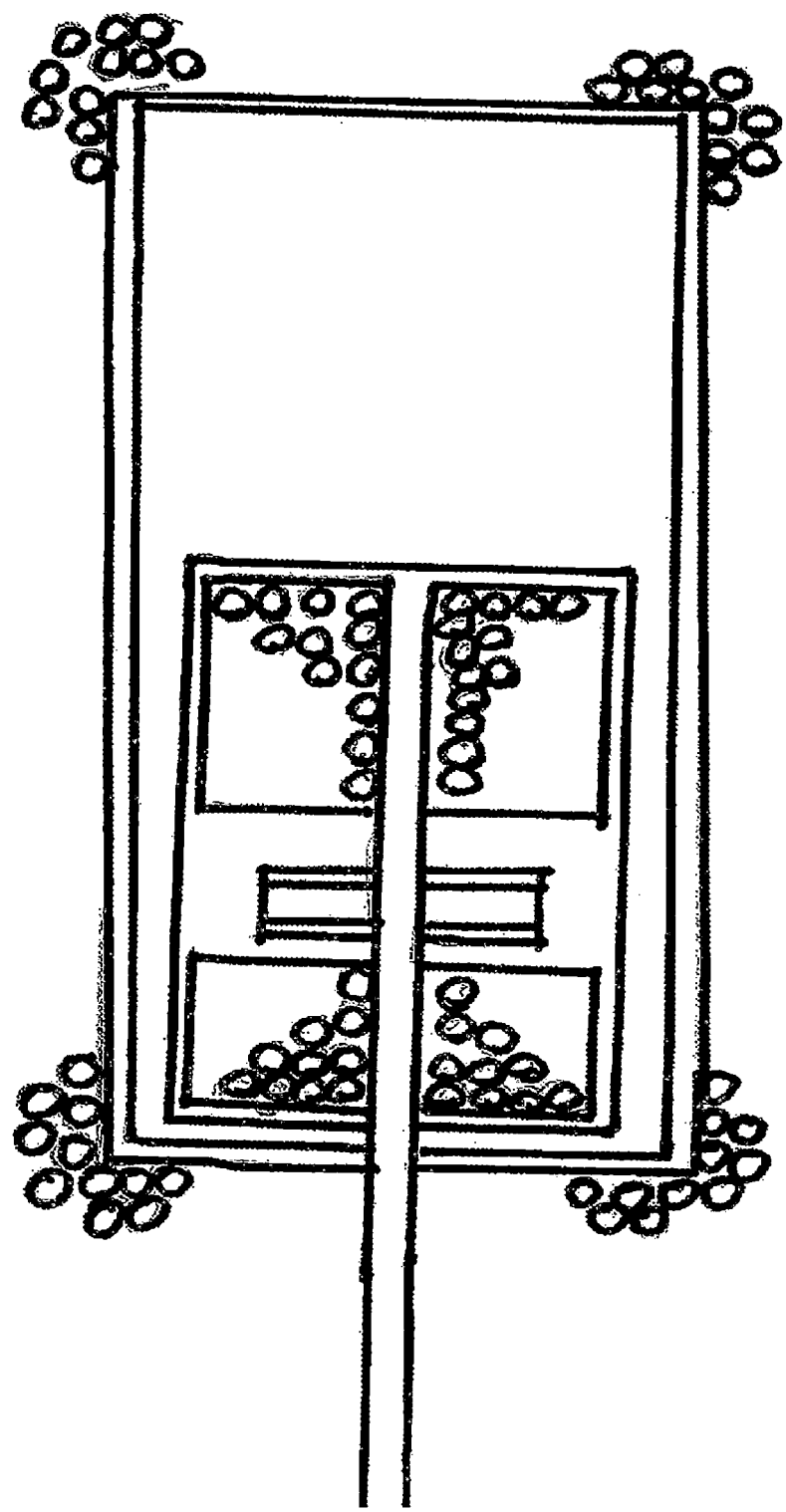
FIG. 7 EMP at the bottom of EMC
FIG. 8 EMP at the top of EMC (PMS contacts at the top)
FIG. 9 EMP in transition through the EMC (no Contact at PMS sites)
FIG. 10 EMP at the bottom of EMC (PMS contacts at the bottom)

FIG. 7 EMP at the bottom of EMC

A cross-sectional view of EMP, EMC, and EMRS—on bottom—Positive power enters the inner coil and the process reverses! The once negative coil will be connected to a positive charge, and charge positive. Capacitance will flip, and the once positive upper coil will be connected to ground, and will display a negative flux. Which will attract the piston back to its starting position.

Figure 8:
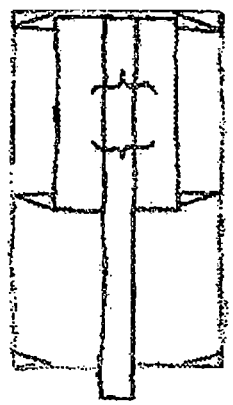

FIG. 8 EMP at the top of EMC (PMS contacts at the top)

The view of EMP, EMC, and EMRS—on top, PMS connected—Power is transferred from EMC to EMP through PMS. Both upper coils are positive and repel each other.

Figure 9:
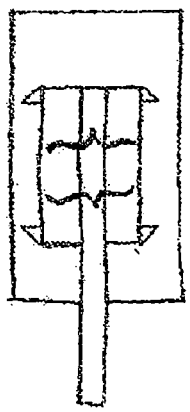

FIG. 9 EMP in transition through the EMC (no Contact at PMS sites)

The view of EMP, EMC, and EMRS—in transition, no connection—No power transfer in the system. Capacitor discharges and energizes Upper and Inner coils simultaneously (fluxes surge positive and negative). EMRS stores fluxes and transfers to battery storage and accessories.

Figure 10:
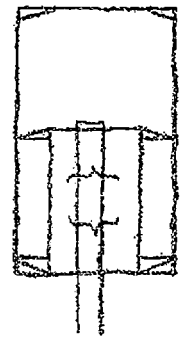

FIG. 10 EMP at the bottom of EMC (PMS contacts at the bottom)

The view of EMP, EMC, and EMRS—on bottom, PMS connection—Power enters through Inner coil, charges in piston reverse forcing EMP into starting position.

The invention claimed is:

1. A motor with multiple electro-magnetic pistons comprising;
    each piston comprises a first coil and a second coil both coils configured to be excited through a power management system (PMS), copper connections located at the top and bottom of each piston and on the interior top and bottom of an electromagnetic chamber,
    one of the coils is a positive polarity and the other coil is the complimentary negative polarity,
    a capacitor physically located on the piston between the first and second coils,
    a voltage source configured to supply varying frequencies of voltages to the coils, as the frequency of the supplied voltages varies so does the movement of the piston in a cylinder chamber,
    multiple of these pistons are connected in series to facilitate charging from one piston to the next the piston,
    each piston comprises top and bottom cavities that can accommodate one additional coil mounted internally in these top and bottom cavities.

* * * * *